Figure 8:
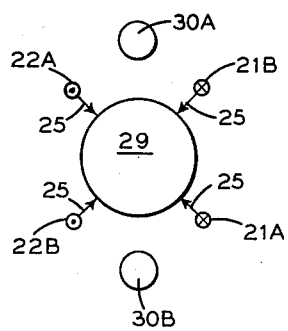

May 22, 1962 W. E. HOVEMEYER ET AL 3,035,353
INTERLINKING FLUX ELECTROMAGNETIC GAUGE
Filed June 8, 1960 3 Sheets-Sheet 1
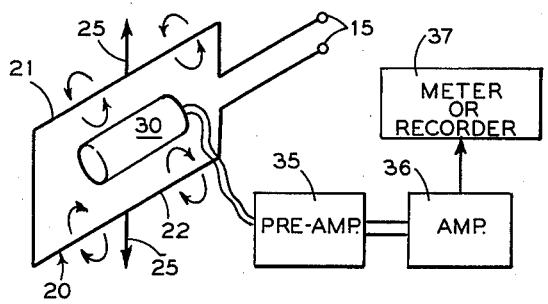
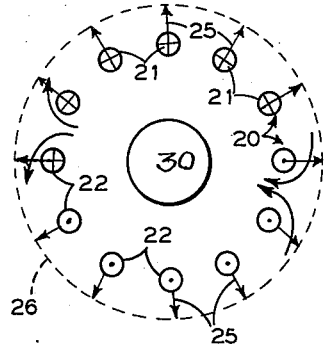
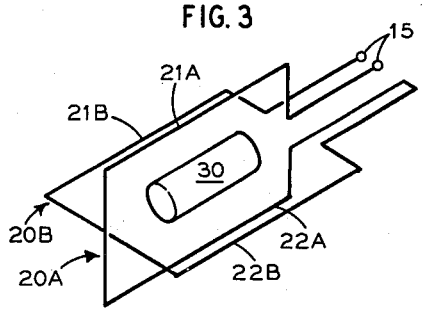
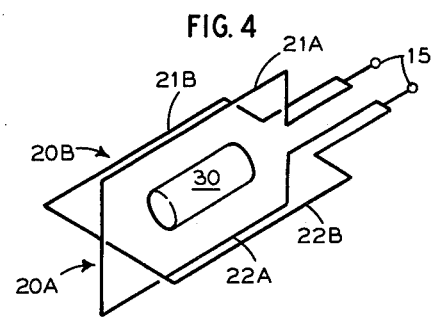
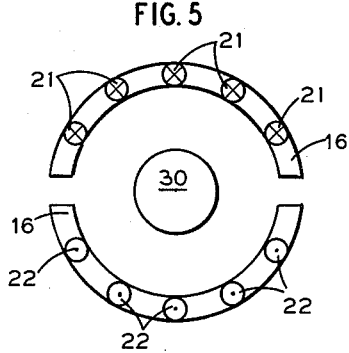
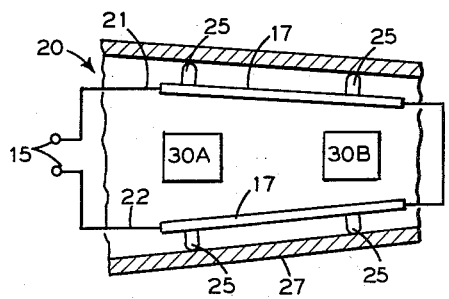
INVENTORS
William E. Hovemeyer
Martin Gutstein
William Begell
BY
ATTORNEYS May 22, 1962 W. E. HOVEMEYER ET AL 3,035,353
INTERLINKING FLUX ELECTROMAGNETIC GAUGE
Filed June 8, 1960 3 Sheets-Sheet 3
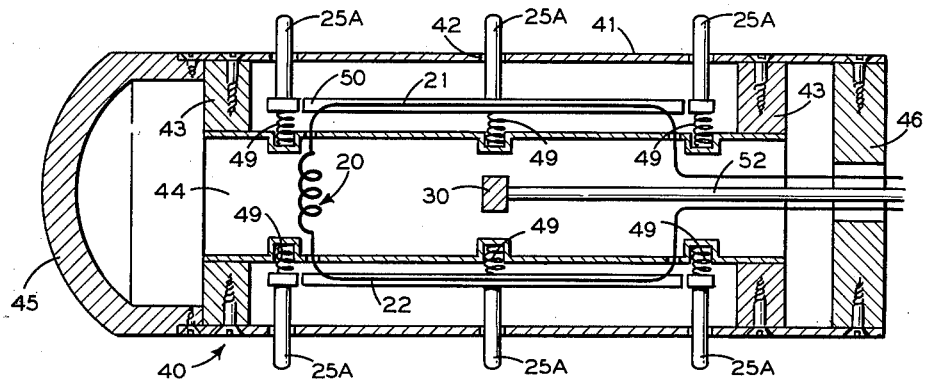
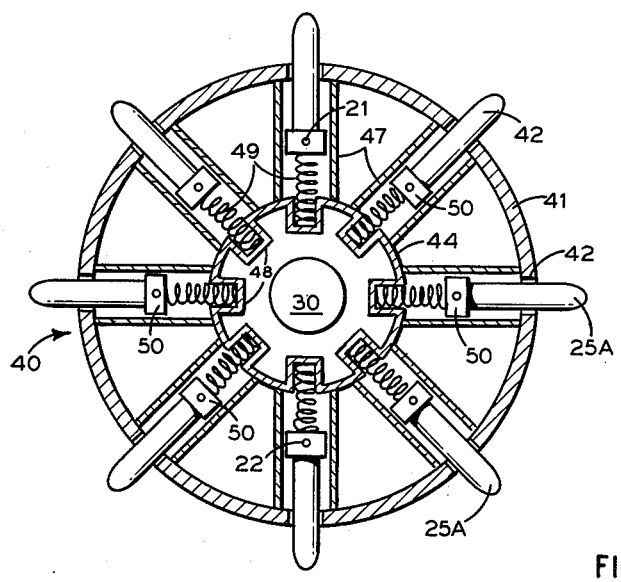
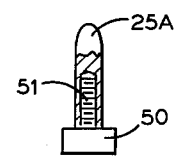
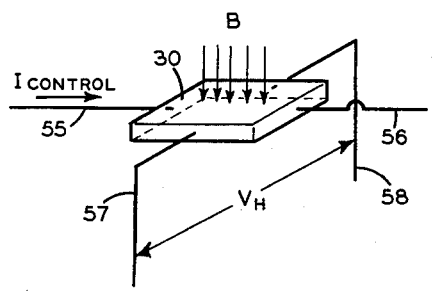
INVENTORS
William E. Hovemeyer
Martin Gutstein
William Begell
BY
ATTORNEYS

United States Patent Office 3,035,353
Patented May 22, 1962

3,035,353
INTERLINKING FLUX ELECTROMAGNETIC GAUGE
William E. Hovemeyer, 8 Allen Drive, Convent Station, N.J.; Martin Gutstein, 2333 Creston Ave., New York, N.Y.; and William Begell, 209—03 32nd Ave., Bayside, N.Y.
Filed June 8, 1960, Ser. No. 34,791
15 Claims. (Cl. 33—174)

This invention relates to measuring apparatus and more particularly, to improved measuring apparatus in which determination of the measured value is effected by measuring the amount of flux interlinkage between pairs of relatively displaceable probe wires carrying the same current.

Various mechanical types of arrangements have been proposed for measuring such values as the internal and external diameters of tubes, rings, etc., and the average thickness of metal plates. Due to the relatively low accuracy of these devices, among other factors, proposals have been made for using magnetic flux devices for measuring such values. Generally, however, these magnetic flux devices have been complicated, difficult to use, and not well adapted for field operations.

In accordance with the present invention, a novel apparatus for measuring such values as the internal and external diameters of metal articles of the class of tubes and rings, and the average thickness of plates, and based upon the magnetic flux principle, is provided in a novel and simple manner. More particularly, a wire loop, including at least two preferably relatively elongated and spaced sections, is arranged to traverse the article whose internal or external diameter or thickness, is to be measured, and the elongated sections of this loop are provided with feelers or probes engageable with a surface or surfaces of such article. The input terminals of the wire loop are connected to a source of electric potential so that the currents flowing in elongated sections of the loop are equal. These current flows produce magnetic fields around the loop sections, and the fluxes of these fields will interlink to a greater or less extent dependent upon the relative spacing of the elongated sections.

A suitable transducer is disposed in operative relation with the loop sections and is responsive to magnetic flux fields thereof. This transducer is so arranged that it will provide a reading corresponding to the combination or flux interlinkage of the magnetic fields around the elongated sections of the loop. These elongated sections are urged in such a direction that the feelers or probes associated therewith will remain in contact with the associated surface or surfaces of the article whose dimension is to be measured. Consequently, as such dimension varies, there will be a variation in the flux interlinkage between the fields surrounding the elongated sections of the loop. The effective value of the flux interlinkage is detected by the transducer, suitably amplified, and used to provide an indication which may be translated into terms of linear measurement. This can easily be effected by suitable calibration of the indicating instrument to read, for example, feet, inches, meters, or other linear measurements. The interlinked fields of the elongated sections of the loop may be combined additively or subtractively, as desired.

Modifications of the basic element of the invention may also be used to provide indications of the taper of an elongated tubular article, or indications of the average diameter throughout the circumference of the article. Also, the apparatus may be adopted readily to measurement of the thickness of plates and the like.

For an understanding of the principles of the invention, reference is made to the following description of typical embodiments thereof as illustrated in the accompanying drawings.

Figure 7:
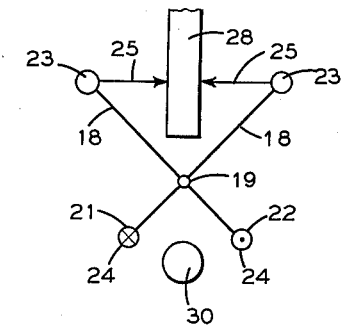
Figure 9:
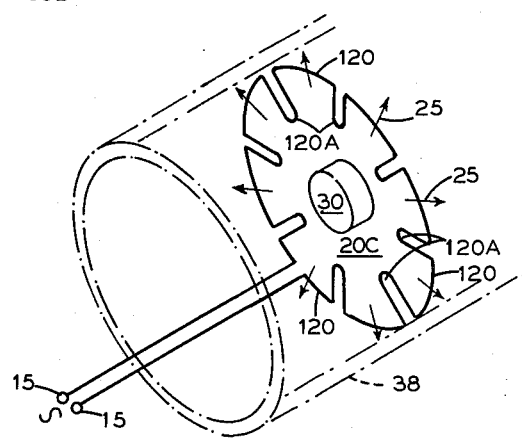
Figure 10:
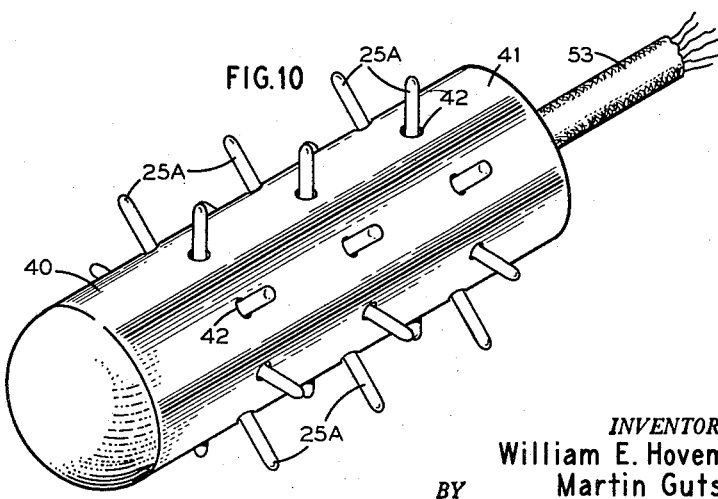

In the drawings:
FIG. 1 is a schematic perspective view of the simplest form of apparatus embodying the invention;
FIG. 2 is a diametric sectional view of a plurality of wire loops, each corresponding to that shown in FIG. 1, used to obtain the average inner diameter of an article;
FIG. 3 is a view of a modified form of the invention including a pair of loops connected in series;
FIG. 4 is a view similar to FIG. 3 with the loops connected in parallel;
FIG. 5 is a diametric sectional view illustrating a plurality of loops arranged to provide the effect of one large loop;
FIG. 6 is a view of the apparatus as arranged for measurement of taper or parallelism;
FIG. 7 illustrates the apparatus as utilized to measure the thickness of a plate or the like;
FIG. 8 is a view, similar to FIG. 2, illustrating the apparatus as used to measure the external diameter of an article;
FIG. 9 is a view of a modified form of the apparatus, in which a single loop is divided into segments or sections each of which is freely relatively movable;
FIG. 10 is a perspective view of a practical device embodying the invention;
FIG. 11 is an axial sectional view of the device shown in FIG. 10;
FIG. 12 is a part elevation and part sectional view illustrating interchangeable probes useful with the device of FIGS. 10, 11 and 13;
FIG. 13 is a diametric sectional view of the device shown in FIG. 10; and
FIG. 14 is a schematic perspective view illustrating the operation of the transducer.

Referring to FIG. 1, the basic elements of the invention device or apparatus comprise the wire loop 20 and the transducer 30. Loop 20 preferably is formed as a substantially rectangular loop with two relatively elongated sides 21 and 22 extending in parallel spaced relation to each other. The loop is energized with either A.C. or D.C. potential applied to a pair of loop input terminals 15, and transducer 30 is positioned substantially intermediate the two sides 21 and 22.

In accordance with well-known electrical technology, the current flowing through each side 21 and 22 produces a magnetic field around the assocated conductor. As the same current is flowing, but in opposite directions, through both sides 21 and 22, the magnetic flux fields around these two sides will be equal but will be opposite in direction. These fields will tend to interlink or interact, with the amount of such interlinkage or interaction being determined by the relative lateral distance between the sides 21 and 22. The transducer 30 provides an output signal, as explained more fully hereinafter, which is proportional to the amount of such interlinkage or interaction of the fields around the sides 21 and 22.

In accordance with the invention, probes are secured to the sides 21 and 22 and are arranged to engage a surface of an article or component whose dimension is to be measured. In the particular arrangement shown in FIG. 1, the device is arranged for measuring the internal diameter of a tube, ring, hole, or the like. Means are provided, although not shown in FIG. 1, to bias the probes 25 outwardly into engagement with the inner surface or wall of the tube, ring, or hole. Thus, the spacing of the wire loop sides 21 and 22 is dependent upon the inner or internal diameter of the tube, ring, or hole, as probed or detected by the probes 25. Thereby, the amount of flux interlinkage affecting the transducer 30 is a measure of the distance between the outer ends of the probes 25, and thus of the inner diameter of the tube, ring, or hole.

The output signal of transducer 30 is applied to a preamplifier 35 and further amplified by an amplifier 36, with the further amplified signal being applied to an indicating or recording meter 37. This meter may be calibrated in terms of lineal dimensions for a direct reading of the value which is measured.

FIG. 2 shows an arrangement for measuring the average inner diameter (I.D.) of a tube or ring indicated at 26. In this case, a plurality of loops 20, each comprising a pair of relatively elongated, substantially rectilinear, and parallel sides 21 and 22, are arranged in uniformly angularly spaced radial or axial planes through the axis of the transducer 30, each of these loops having a probe 25 associated with its respective parallel sides. The transducer 30, in this case, will provide an output signal corresponding to the combination of the flux interlinkages of the several loops, and thus give an indication of the average inner diameter of the tube, cylinder, or ring 26.

In the arrangement shown in FIG. 3, a pair of loops 20A and 20B, each having a pair of elongated, rectilinear, and parallel sides 21A, 21B, 22A, 22B, are connected in series with each other to the terminals 15. Loops 20A and 20B are disposed in planes intersecting perpendicular to each other at substantially the axis of the curvilinear section component whose inner or outer diameter is to be measured. The longer sides of the loops 20A and 20B are provided with the probes 25, which may project therefrom in a selected direction depending upon whether the device is to be used to measure the internal diameter of such component or the external diameter thereof. For the sake of clarity, these probes have been omitted from FIG. 3. The transducer 30 in this case, as in the case of the arrangement shown in FIG. 2, measures the total flux interlinkage of the two loops 20A and 20B and thus has an output corresponding to the average internal or external diameter being measured.

FIG. 6 illustrates an arrangement for measurement of parallelism or of taper of a component 27. As illustrated, the arrangement is shown as measuring the taper of component 27. In this case, the sides 21 and 22 of the loop are secured to rigid support elements 17 on which probes 25 are mounted. Two transducers, 30A and 30B, are provided, one near each end of the support elements 17. Thus, in the arrangement illustrated, transducer 30A will give a measure of the larger diameter at one end of a given length of the component 27, and transducer 30B will give a measure of the smaller diameter at the opposite end of such given length of component 27. In this figure, and in several of the other figures, the biasing means for urging the probes 25 into engagement with the surfaces of the component to be measured have been omitted for the sake of clarity.

FIG. 7 shows the device as modified for the measurement of the thickness of a plate or the like. In this modification, a pair of levers 18 are pivoted together at 19 in such a manner as to provide each lever with a relatively short arm and a relatively long arm. Supports 23 on the outer ends of the longer arms of levers 18 carry probes 25 engageable with the opposite surfaces of a plate 28 whose thickness is to be measured. The sides 21 and 22 of the loop 20 are carried by supports 24 on the outer ends of the shorter arms of the levers 18, and a transducer 30 is mounted between the supports 24. In this case, the thinner the plate 28, the greater will be the flux interlinkage operative on the transducer 30, so that the meter would be calibrated in linear dimensions descending relative to ascending values of flux interlinkage.

FIG. 8 shows an arrangement for measuring the outer diameter of a cylindrical component 29. Referring to FIG. 8, two loops 20A and 20B having respective sides 21 and 22 are provided, the two loops lying in planes intersecting each other at right angles and the respective sides having the probes 24 engageable with the outer surface of cylinder or rod 29. A first transducer 30A is disposed between side 22A of loop 20A and side 21B of loop 20B, and a second transducer 30B is disposed between side 21A of loop 20A and side 22B of loop 20B. The loops may be arranged, for example, as shown in FIGS. 3 and 4, or as shown in FIG. 2. With variations in external or outer diameter (O.D) of rod or cylinder 29, the sides of the respective loops will move inwardly or outwardly relative to the axis of component 29 and thus will approach or recede from the respective transducers to give a measure of the average diameter of the component 29.

FIG. 9 shows a modified arrangement for measuring the internal diameter of a tubular component, such as indicated at 38. In this arrangement, a single loop 20C, having its ends connected to the input terminals 15, is effectively divided into circumferentially separated, and substantially equal length and relatively elongated arcuate segments or sections 120 by radially reentrant portions 120A. Each segment 120 is provided with a probe 25 engageable with the interior surface of component 38, and a transducer 30 is mounted at the axis of the circular loop. The relative distance of the segments 120 from the transducer 30 will control the flux interlinkage operative on the transducer and thus give a measure of the average internal diameter of the component 30A.

FIGS. 10 through 13 illustrate the practical form which a probe, for measuring the internal diameter of a tube or the like, may take in practice. Referring to these figures, the probe, which is generally indicated at 40, comprises an outer tubular shell 41 which is formed, at axially spaced locations therealong, with uniformly circumferentially spaced openings 42 arranged in common diametrical planes. Outer sleeve 41 is secured to a pair of annular baffles or supports 43 receiving an inner sleeve 44. Sleeve 41 extends beyond the rings 43 at each end, and the forward end of sleeve 41 is secured to a substantially hemispherical nose 45, having a cylindrical extension secured to sleeve 41. Nose 45 abuts against the adjacent ring 43. The rear or inner end of sleeve 41 is secured to an annular wall 46.

Radial support struts 47 extend between sleeve 41 and sleeve 44 in centered relation with the openings 42. Sleeve 44 is formed with cylindrical cup shape spring pockets 48 each co-axial with an opening 42. Springs 49, engaged in spring seats or recesses 48 and extending between struts 47 bias elongated bars 50 outwardly toward shell 41. Bars 50 are provided with threaded studs 51 aligned with the apertures 42 to interchangeably receive probes 25A, as best seen in FIG. 12. Elongated sides 21 and 22 of the several loops are supported in or on the bars 50 and extend therealong. The several loops are arranged in diametric planes which are spaced from each other by equal angular distances. As best seen in FIG. 11, the closed outer end of each loop 20 is coiled to allow for relative radial displacement of the elongated sides 21 and 22. The leads of the loops are brought out through the opening in back closure plate 46, and connected to input terminals 15. Schematically, the arrangement is essentially similar to that indicated in FIG. 2.

Probe 30 is mounted on the end of a support rod 52 extending inwardly through the opening in back plate 46, the probe being disposed substantially mid-way of the length of the elongated sides of the loops 20. The several loops are grouped into a cable 53 extending rearwardly from the probing device 40.

As the arrangement operates in the same manner as described for that schematically shown in FIG. 2, it is not believed necessary to describe the operation in detail. However, it may be noted that the studs 51 provide for interchanging of the probes 25A for longer and shorter probes in accordance with the approximate inner diameter of the component to be measured. Suitable support means may be provided for carrying the probe device 40 along the interior of the tubular component, such supporting means not having been shown as they are conventional, and may be much along the same lines as the support means for inside bead trimmers used in the manufacture of electrically weld resistance welded tubing.

FIG. 14 schematically illustrates the operation of a transducer 30. The transducer 30 is essentially a crystal which, when it has a control current flow therethrough as indicated by the conductors 55 and 56, and a magnetic field B applied thereto, will produce an output voltage $V_h$ across the conductors 57 and 58, the output voltage being proportional, for a given value of the control current, to the effective magnetic flux field B acting on the crystal. Transducers of this type are well-known in the art.

While specific embodiments of the invention have been described in detail to illustrate the application of the principles of the invention, it will be understood that the invention may be embodied otherwise without departing from such principles.

What is claimed is:

1. Apparatus for measuring dimensions of components, such as a diameter of a cylinder, tube, or the like, or the thickness of a plate, comprising, in combination, an electrically conductive loop continuous between a pair of input terminals adapted for connection of a source of electric potential thereacross, and including a pair of laterally spaced substantially co-planar sections; probe means secured to each section to contact spaced surface portions of the component, the spacing of which surface portions is to be measured; an interlinked magnetic flux responsive transducer within the magnetic flux fields surrounding said sections as a result of current flow through said loop; said probe means displacing the associated loop sections relative to each other in accordance with the spacing of such surface portions; whereby the degree of interlinkage of the magnetic fluxes of said loop sections is a function of the spacing of such surface portions; the output signal of said transducer being a function of the flux interlinkage acting upon the same.

2. Apparatus as claimed in claim 1, in which said loop is circular; said laterally spaced sections comprising substantially equal length arcuate segments of the loop separated by radially inwardly extending rentrant portions of the loop.

3. Apparatus for measuring dimensions of components, such as a diameter of a cylinder, tube, or the like, or the thickness of a plate, comprising, in combination, an electrically conductive loop continuous between a pair of input terminals adapted for connection of a source of electric potential thereacross, and including a pair of substantially parallel, co-planar, and relatively elongated sides; probe means secured to each side to contact spaced surface portions of the component, the spacing of which surface portions is to be measured; an interlinked magnetic flux responsive transducer within the magnetic flux fields surrounding said sides as a result of current flow through said loop; said probe means displacing the associated loop sides relative to each other in accordance with the spacing of said surface portions; whereby the degree of interlinkage of the magnetic fluxes of said loop sides is a function of the spacing of said surface portions; the output signal of said transducer being a function of the flux interlinkage acting upon the same.

4. Apparatus as claimed in claim 3, and designed for measuring the diameter of a cylinder, tube, or the like, comprising plural loops arranged in planes intersecting in the axis of the cylinder, tube or the like and spaced at equal angular distances from each other; the transducer being located within the magnetic flux fields of the sides of all of the loops so as to provide an indication of the average diameter of the cylinder, tube or the like.

5. Apparatus as claimed in claim 1, including a pair of said loops connected in series with each other between said input terminals.

6. Apparatus as claimed in claim 1, including a pair of said loops connected in parallel with each other between said input terminals.

7. Apparatus as claimed in claim 4, in which corresponding sides of each of the loops are arranged on a common support of arcuate cross section; the other sides of each of the loops being arranged on a second common support of arcuate cross section concentric with and diametrically opposite the first common support.

8. Apparatus as claimed in claim 3, for measuring the parallelism or taper of the internal surface of a tube; said loop sides being secured along relatively elongated rigid supports; said supports being equal in length and disposed diametrically opposite each other and each support having a pair of probes mounted thereon and respectively disposed near the opposite ends of the associated support; said transducer being substantially centered in the diametric plane through one pair of probes; and a second transducer substantially centered in the diametric plane through the other pair of probes; whereby measurements of the diameters at axially spaced points along such interior surface are obtained simultaneously.

9. Apparatus as claimed in claim 3, for measuring the thickness of a plate or the like; said loop sides being secured to relatively rigid support members; said support members being mounted on one end of each of a pair of levers pivoted together intermediate their ends; said probe means including a pair of probes extending from the opposite ends of said levers toward each other and in substantial rectilinearly aligned relation and arranged to engage opposite surfaces of the plate whose thickness is to be measured.

10. Apparatus as claimed in claim 3, for measuring the external diameter of a cylindrical element; a pair of said loops disposed in perpendicularly intersecting planes; the loops embracing the element to be measured and the probes extending into contact with the external surface thereof; said transducer being within the magnetic flux fields of one side of each loop; and a second transducer within the magnetic flux fields of the other sides of each loop; whereby to measure the average external diameter of the cylinder.

11. Apparatus for measuring the internal diameter of a tubular component comprising, in combination, an outer substantially cylindrical shell having uniformly circumferentially spaced openings therein in diametric planes spaced axially of the shell; a plurality of probes within said shell, each projecting outwardly through one of said openings; a plurality of relatively rigid supports extending longitudinally of said shell within the latter and each secured to axially aligned probes; a plurality of electrically conductive loops within said shell and each continuous between a pair of input terminals adapted for application of a source of electric potential thereacross, each loop including a pair of substantially parallel, co-planar and relatively elongated sides each extending along one of said supports; an interlinked magnetic flux responsive transducer positioned within said shell and within the magnetic flux fields surrounding said loop sides as a result of current flow through said loops; said probes displacing the associated conductor and supported loop sides relative to each other in accordance with the internal diameter of the component to be measured; whereby the degree of interlinkage of the magnetic fluxes of said loop sides is a function of the internal diameter of the component; the output signal of said transducer being a function of the flux interlinkage acting upon the same to provide an output signal corresponding to the average internal diameter of the component.

12. Apparatus for measuring the internal diameter of a tubular component, as claimed in claim 11, in which each of said supports has plural threaded studs projecting therefrom radially of said shell; said probes being interchangeably threadedly engaged with said studs.

13. Apparatus for measuring the internal diameter of a tubular component, as claimed in claim 11, including an inner substantially cylindrical shell extending substantially coaxially of said outer shell; annular support means interconnecting said two shells; said inner shell having radially inwardly extending pockets forming spring seats each aligned with one of said openings; said biasing means comprising coil springs in said spring seats and engaging said supports.

14. Apparatus for measuring the internal diameter of a tubular component, as claimed in claim 13, including pairs of substantially radial partitions each extending between said inner and outer shells on opposite sides of a support member.

15. Apparatus for measuring the internal diameter of a tubular element, as claimed in claim 14, including a nose secured to the forward end of said outer shell and closing said forward end.

References Cited in the file of this patent

UNITED STATES PATENTS

| | | |
|---|---|---|
| 2,074,753 | McClain | Mar. 23, 1937 |
| 2,514,847 | Coroniti | July 11, 1950 |

FOREIGN PATENTS

| | | |
|---|---|---|
| 971,995 | France | Jan. 24, 1951 |